Sept. 18, 1928. 1,684,785
R. F. M. WEBKING
LIQUID MEASURING APPARATUS
Filed Feb. 21, 1921  2 Sheets-Sheet 1

INVENTOR.
ROY FREDERICK MAURICE WEBKING
BY HIS PATENT ATTORNEY.

Sept. 18, 1928.
R. F. M. WEBKING
1,684,785
LIQUID MEASURING APPARATUS
Filed Feb. 21, 1921       2 Sheets-Sheet 2
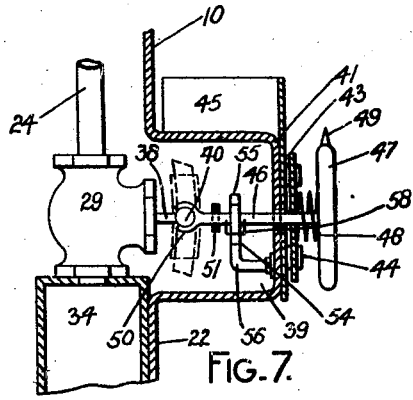
FIG. 7.
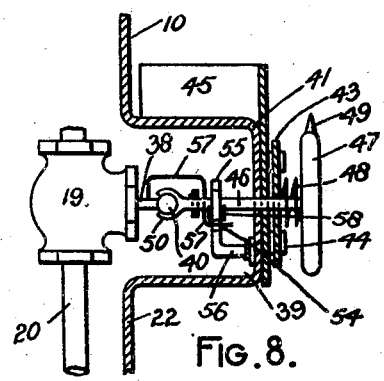
FIG. 8.
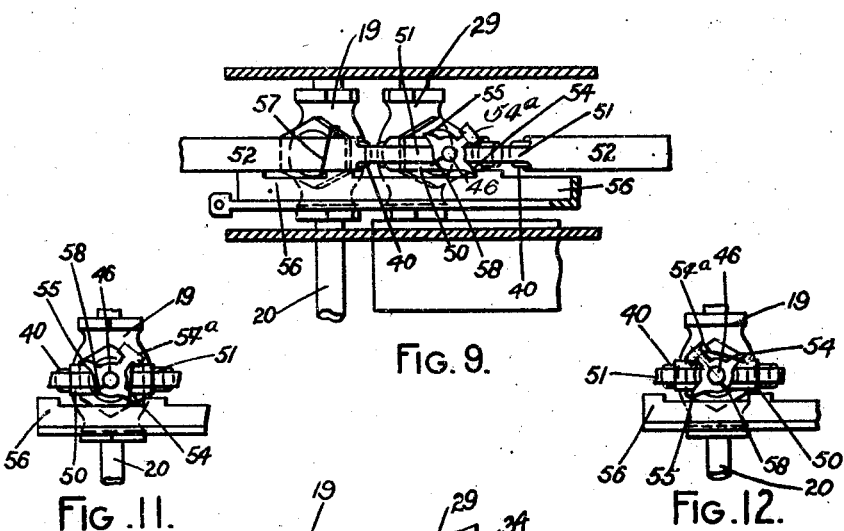
INVENTOR
ROY FREDERICK MAURICE WEBKING.
Marks+Clerk
Attys.

Patented Sept. 18, 1928.

1,684,785

UNITED STATES PATENT OFFICE.

ROY FREDERICK MAURICE WEBKING, OF BONDI, NEAR SYDNEY, NEW SOUTH WALES, AUSTRALIA.

LIQUID-MEASURING APPARATUS.

Application filed February 21, 1921, Serial No. 446,800, and in Australia March 25, 1920.

This invention relates to measuring liquid supply apparatus whereby liquid as petrol or the like is vended by measure and it has been specially devised to provide such an apparatus as will truly measure its contents and truly indicate the same before delivery thereof and whose containing extent and whose variability of such extent or measure within reasonable bounds are controlled by choice of the attendant or vendor.

According to these improvements the measuring vessel has opposite windows having marked thereon symbols, figures or indices representing liquid measures and in it are overflow pipes whose lengths respectively determine the measure indicated by the respective symbols on the window of said vessel and whose entrance at bottom each has a cock or valve independently operated by a control lever (which also operates a delivery cock).

The cocks of the overflow pipes and the delivery cock are arranged arcually and a sleeve on the control lever is adapted to slide upon the wings or heads of said cocks and be caused to open any one and compulsorily to close it before passing on to another cock 3; a contrivance being arranged to prevent backward movement of the control lever to a lower measure after operating an overflow cock to supply liquid to the measuring chamber but to allow said lever forward movement to the overflow pipes of greater measures and to the delivery cock and afterwards then be free to be moved back to operate the smallest measure controlled by any of the overflow cocks.

But in order that this invention may be readily carried into practical effect a measuring vessel or liquid supply apparatus embodying these present improvements will now be described with reference to the drawings accompanying and forming part of this complete specification.

Fig. 1 is an elevation of the liquid measuring apparatus. Fig. 2 a central sectional elevation thereof. Fig. 3 a sectional plan on line 3—3 in Fig. 1. Fig. 4 a side elevation similar to that of Fig. 1 but at an angle of 90 degrees thereto. Fig. 5 is a similar view to Fig. 4 but partly in section. Fig. 6 is a partial sectional plan on line 6—6 in Fig. 4.

Fig. 7 is a fragmentary vertical sectional view showing one of the valves of the overflow pipes and the actuating device therefor.

Fig. 8 is a sectional view similar to Fig. 7 showing the controlling valve for the outlet pipe.

Fig. 9 is an enlarged fragmentary sectional view taken at right angles to Figs. 7 and 8 and showing the cocks of the inlet and outlet pipes and the control and locking devices associated therewith.

Fig. 10 is a fragmentary horizontal section showing the operating stem and controlling means therefor in plan.

Figs. 11 and 12 are detail views of the valve of the outlet pipe showing the various positions of the locking device, Fig. 11 showing the locking device in position to prevent movement of the operating handle to the right, and Fig. 12 showing the position of the locking device subsequent to its actuation caused by the opening of the outlet cock.

Figure 1:
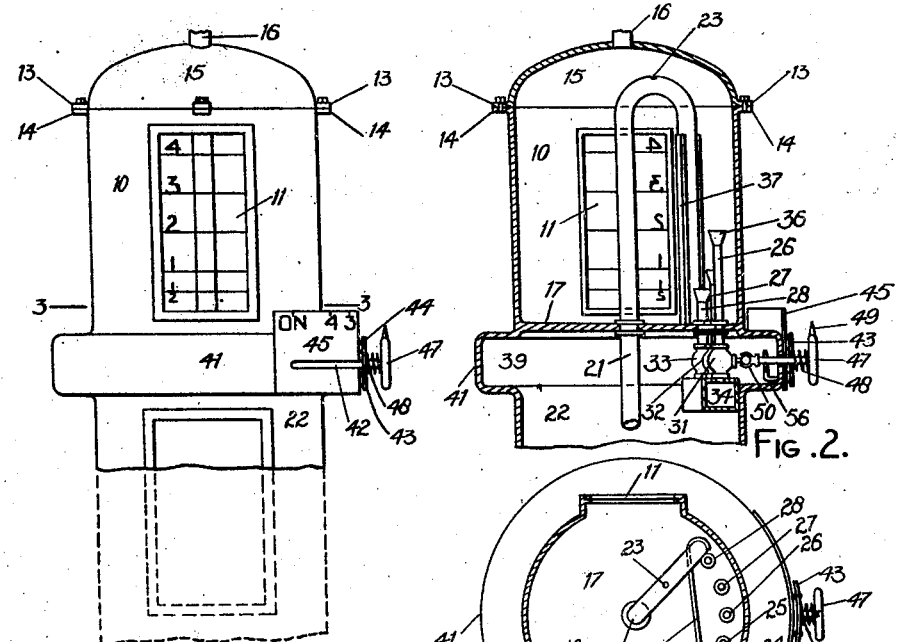
Figure 3:
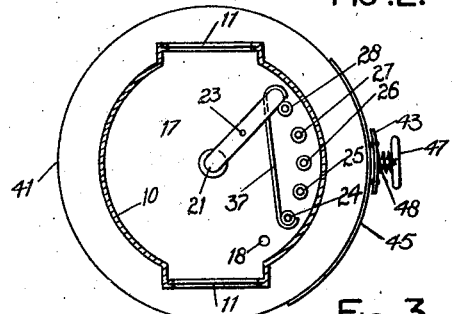
Figures 4, 5:
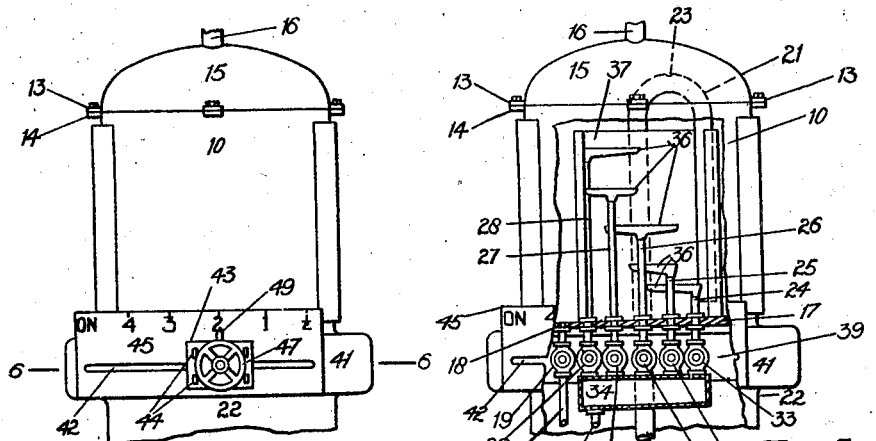
Figure 6:
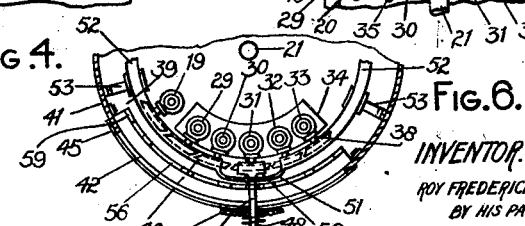

The cylindrical measuring vessel 10 has oblong sight holes or windows 11 diametrically opposite one another and upon whose glass panes is marked the liquid measure levels by the numerals 4, 3, 2, 1 and ½. Bolted to said vessel 10 through flanges 13 and 14 is a domed top 15 preferably having a central standard 16 adaptable for supporting a sign or a light or both. The vessel 10 has a bottom 17 sloping towards a discharge outlet 18 and control cock 19 and a pipe 20 to which latter a funnel or a hose or the like (not shown) may be connected. A supply pipe 21 from a pump in the hollow pedestal 22 passes medially through the bottom 17 and extending to nearly the top of said vessel 10 bends over (having at top of the bend an air vent 23) and reaches nearly to the bottom thereof.

Overflow pipes 24, 25, 26, 27, and 28 arranged concentrically with the wall of the vessel rise through the bottom 17 from cocks 29, 30, 31, 32 and 33 respectively positioned below upon a receiving vessel 34 having an outlet pipe 35 to an under tank or receiver (not shown). The overflow pipes 24 to 28 have preferably rectangular trough like tops 36 (though they might have funnel or bell tops) whose upper edges are adjusted to the horizontal level of the respective measure indicators on the windows 11. Parts of the inlet pipe 21 and the overflow pipes 24 to 28 are preferably hidden by a shield 37 hooked around overflow pipe 28 and inlet pipe 21.

The operating stems 38 of the overflow cocks 29 to 33 and discharge outlet cock 19 project into an annular space 39 below the bottom 17 of the vessel 10 and have arc shaped T-heads 40 arranged concentrically with the sector line of cocks.

A circumferential opening or slot 42 is made in the wall 41 opposite the heads 40 of the cocks 29 to 33 and 19 and through the slot 42 the stem 46 of the control or operating handle or wheel 47 passes while outwardly of the wall 41 is a guide plate 43 having anti-friction rollers 44 set in its face and adapted to travel against a curved shield 45 secured to wall 41, the slot 42 therein allowing arcual movement to the stem 46. On the face of the shield 45 opposite the delivery cock 19 is the indicating word "On" and opposite each of the overflow cocks 29 to 33 respectively are the figures or symbols 4, 3, 2, 1 and ½ indicating, say, gallons.

The guide plate 43 provides a bearing for stem 46 of the operating handle 47 and between guide plate 43 and said wheel 47 is a spring 48. This handle has pointer 49 and the guide plate 43 may also carry an indicator. A midsleeve 50 adapted to slide over the T-heads 40 is fixed to the inner end of stem 46, and two outer sleeves 52 somewhat longer are joined and carried by the ends of a bracket 51 in which is a bearing for said stem 46.

These outer sleeves 52 have each a bearing in a bracket 53. A double ended stop head 54—55 is rotatably mounted on stem 46 upon which latter there is a loop 58 juxtaposed to said stop head 54—55 and adapted to contact therewith. A recessed stop plate 56 is secured (below said stop head 54—55) to the wall 41. The stop head 54—55 is provided at its upper portion at a point midway between the teeth with a radial extension 54ᵃ constituting a weight. The arrangement of the weight is such that when the stop-head is tilted from the one position indicated in Figure 11, to its other position indicated in Figure 12, said weight will act to maintain the stop-head in its adjusted position while permitting either of its teeth to ride over the recessed stopplate 56. An arm 57 which is carried by the stem 38 of the cock 19 is cranked as in Fig. 8 to allow partial orbital movement clear of the T-head 40, sleeve 52 and bracket 51.

When a given quantity of liquid say 1 gallon is required to be delivered if the operating handle 47 is at that index (1) on the shield 45 the overflow cock 32 may be opened by a quarter revolution of said handle 47 and the vessel 10 filled to the level of the top of that overflow pipe 27 and of the positional indices on the opposite windows 11. But if say two gallons of liquid are to be delivered and said operating handle 47 is not at the indices of that quantity but is say near the ½ gallon symbol on shield 45 said operating handle 47 is moved around (the guide plate 43 freely sliding on the rollers 44 over shield 45) until the pointer 49 aligns with the figure or symbol 2 on said shield 45. As the stem 46 moves in its arcual path from a low to a higher figure the mid sleeve 50 slides in turn upon the T-heads 40 of the cocks of overflow pipes allowing greater measure until it reaches the selected pipe of the pipes 26 where, holding the T-heads 40 of the cocks 31, it may be turned, while in the travelling movement the long sleeves 52 similarly thread over the said T-heads 40 of the other cocks and hold them all in locked position and also prevent the mid sleeve 50 from being operated if it is not in the centre of the respective T-head 40. The cock 31 being turned on, the pump is operated to draw liquid from the storage tank and force it up through inlet pipe 21 into the measuring vessel 10 wherein its level cannot be higher that that of the desired measure of liquid by reason of escape of all excess from the overflow pipe 26 of said measure indicated and comparable by graduation marks on each window 11. The top 36 of each overflow pipe is preferably so shaped that it will compensate for small horizontal variations which might take place in the level of liquid in the measuring vessel 10 owing to uneven positioning of the latter and consists of a comparatively long narrow trough or gutter. The stop head member 54 when in the recesses of stop plate 56 prevents the operating handle 47 from being moved from a large to a smaller measure overflow cock until the quantity of measured liquid in the vessel 10 is delivered through cock 19. To deliver the measured liquid from the vessel 10 the overflow cock 31 is closed and the operating handle 47 moved around on the shield 45 and its pointer 49 aligned with index word "On" whereupon the mid sleeve 50 holds the T-head 40 of the discharge outlet cock 19 so that it may be turned to open that cock (the plug being turned reversely to those of the overflow cocks) and allow the liquid to be delivered through a hose or the like where desired.

When the handle 47 becomes juxtaposed to the head 40 of the cock 19 the lower stop head member 54 rides over the free end of the double cranked arm 57 which is resting upon the stop plate 56 so that as and when the cock 19 is turned on by turning the handle 47 to the left, said end of the arm 57, which latter is carried by the plug 38 of said cock 19, overturns the stop head member 54—55, the member 54 then being disposed upwardly and the member 55 downwardly and resting upon the loop 58. The operating handle 47 can then be moved arcually to the right to another set position so that the cock of any one overflow pipe of any desired measure can be opened and the admitted and thus measured contents of the vessel may thereafter be delivered by opening the discharge cock 19. This opening of an overflow cock by turning to the right the handle 47 and consequently the stem 46 which carries the loop 58 with it overturns the stop head 54—55 returning the member 54 back onto the stop plate 56 so that it will engage with the recesses therein and thus prevent the operating handle 47 from being moved to the right to a smaller measure overflow cock until after the handle has been moved to the left and the delivery cock 19 has been opened, thereby again altering the relative positions, in regard to the recesses of the stop plate 56, of the members 54 and 55 of the stop head.

Having now fully described and ascertained my said invention and the manner in which it is to be performed I declare that what I claim is:—

1. In a liquid supply apparatus, a measuring vessel having opposed windows, an inlet pipe and a delivery outlet for said vessel, a control cock for said outlet, arcually arranged overflow pipes extending into the said vessel, an independent control cock for each overflow pipe, a return pipe common to said overflow pipes, and controlling mechanism comprising an arcually traversable stem adapted to engage and operate in turn any one of all said cocks.

2. In a liquid supply apparatus in combination with a measuring vessel having windows, an inlet pipe and a delivery outlet connected with said vessel, a control cock for the outlet pipe, overflow pipes, a control cock for each overflow pipe, a common return pipe connected with the overflow pipes and arcually traversable controlling means engageable with any one of the several cocks for actuating the latter and carrying control locking devices comprising a double ended reversible stop head, and a recessed stop plate for said head to ride upon and engage in.

3. In a liquid supply apparatus, a measuring vessel, an inlet pipe and a delivery outlet connected with said vessel, a control cock for the outlet pipe, a plurality of overflow pipes, a control cock for each overflow pipe, a common return pipe connected with the several overflow pipes, each of said control cocks including a rotatable control member, an actuating member selectively engageable with the several rotatable members, and guide members carried by the actuating member having sliding engagement with the rotatable members and arranged at the opposite sides of the actuating member.

4. In a liquid supply apparatus, a measuring vessel, an inlet pipe and a delivery outlet connected with said vessel, a control cock for the outlet pipe, a plurality of overflow pipes, a control cock for each overflow pipe, a common return pipe connected with the several overflow pipes, each of said control cocks including a rotatable control member, a stem arcually traversable with respect to the vessel, an intermediate sleeve member selectively engageable with the rotatable members of the cocks, a double-ended stop member pivoted to said stem, a recessed stop plate engageable by the stop, a stop lifting member carried by said stem, and a stop lifting arm carried by the stem of the control cock of the outlet pipe.

5. In a liquid supply apparatus, a measuring vessel having an inclined bottom, a delivery pipe connected with the vessel at the lowest point of said bottom, a control valve for said pipe, a plurality of overflow pipes terminating in various planes within the vessel, valves for controlling said overflow pipes, a hollow supporting pedestal for said vessel having an arcual slot, an actuating member selectively engageable with the stems of the several valves and mounted for movement in said slot, and a guide plate carried by said member.

6. In a liquid supply apparatus, a measuring vessel, delivery and overflow pipes connected with said vessel, valves for the several pipes, an arcually traversable valve stem rotating member selectively engageable with the several valve stems for rotating them, and an indicating member associated with said valve stem rotating member for indicating the position of same relative to the respective valves.

7. In a liquid supply apparatus, a measuring vessel, delivery and overflow pipes connected with said vessel, control valves connected with the several pipes, an arcually traversable valve stem rotating member engageable with any one of the several valve stems, an indicating member associated with said valve stem rotating member, a guide plate carried by and arcually traversable with said member, and a pointer carried by said member.

8. In a liquid supply apparatus, a measuring vessel, delivery and overflow pipes connected with said vessel, valves for the several pipes, an arcually traversable valve stem rotating member selectively engageable with the several valve stems for rotating the latter, and an indicating member associated with the valve stem rotating member, for indicating the position of the latter relative to the respective stems of the control valves, said valve stem rotating member including a rotatable stem provided at its inner end with a valve stem engaging part, and valve stem engaging members arranged at opposite sides of said valve stem engaging part for embracing and locking the stems of all the other valves not engaged by said stem engaging part.

9. In a liquid supply apparatus, a measuring vessel, delivery and overflow pipes connected with said vessel, valves for the several pipes, an arcually traversable valve stem rotating member selectively engageable with the several valve stems for rotating the latter, and an indicating member associated with the valve stem rotating member for indicating the position of the latter relative to the respective valve stems, a double ended stop pivoted to the valve stem rotating member, a relatively stationary stop plate engageable by the double ended stop, a lifting arm carried by the stem of the valve in the delivery pipe and engageable with said stop, and an oppositely lifting loop on the rotatable stem of the valve stem rotating member and engageable with said stop.

Dated this eighteenth day of January, A. D. 1921.

ROY FREDERICK MAURICE WEBKING.